US007434362B2

(12) United States Patent
Liebendorfer

(10) Patent No.: US 7,434,362 B2
(45) Date of Patent: Oct. 14, 2008

(54) SYSTEM FOR REMOVABLY AND ADJUSTABLY MOUNTING A DEVICE ON A SURFACE

(75) Inventor: John E. Liebendorfer, Albuquerque, NM (US)

(73) Assignee: UniRac, Inc., Albuquerque, NM (US)

( * ) Notice: Subject to any disclaimer, the term of this patent is extended or adjusted under 35 U.S.C. 154(b) by 593 days.

(21) Appl. No.: 09/910,655

(22) Filed: Jul. 20, 2001

(65) Prior Publication Data

US 2003/0015636 A1 Jan. 23, 2003

(51) Int. Cl.
*E04D 13/18* (2006.01)
*E04C 3/00* (2006.01)
*H01L 31/042* (2006.01)

(52) U.S. Cl. .................. 52/173.3; 52/460; 136/244

(58) Field of Classification Search ............... 52/173.3, 52/460, 464, 467, 468, 506.06, 220.3, 480; 52/483.1, 668, 669, 200, 730.4, 731.4, 731.5; 136/244, 251, 259; 126/621
See application file for complete search history.

(56) References Cited

U.S. PATENT DOCUMENTS

| | | | |
|---|---|---|---|
| 2,317,428 A | | 4/1943 | Anderson |
| 2,969,421 A | | 1/1961 | Scott, Jr. |
| 3,210,716 A | | 10/1965 | Meacham |
| 3,261,625 A | * | 7/1966 | Cripe ................ 403/173 |
| 3,443,350 A | * | 5/1969 | Birum, Jr. ............ 52/459 |
| 3,513,606 A | * | 5/1970 | Jones .................. 52/27 |
| 3,529,274 A | * | 9/1970 | Routh ................ 439/118 |
| 3,551,876 A | * | 12/1970 | Walter ............... 439/110 |
| 3,727,171 A | * | 4/1973 | Coles et al. ........ 439/110 |
| 3,778,175 A | * | 12/1973 | Zimmer .............. 403/187 |
| 3,944,636 A | | 3/1976 | Schuldenberg et al. |
| 3,954,922 A | | 5/1976 | Walker et al. |
| 3,977,606 A | | 8/1976 | Wyss |
| 3,978,565 A | | 9/1976 | Flisch et al. |
| 3,978,745 A | | 9/1976 | Okamoto et al. |
| 3,994,999 A | | 11/1976 | Phelps |
| 3,995,689 A | | 12/1976 | Cates |

(Continued)

FOREIGN PATENT DOCUMENTS

DE 2427826 B2 2/1979

(Continued)

OTHER PUBLICATIONS

Article appearing in "Photon," a German-language periodical published in Europe in Jan. 2001, entitled *Bordensteinkanten*.

(Continued)

*Primary Examiner*—Anita M King
(74) *Attorney, Agent, or Firm*—Wilmer Cutler Pickering Hale and Dorr LLP

(57) ABSTRACT

A system for removably and adjustably mounting a device on a surface is provided. The system for removably and adjustably mounting a device on a surface, according to the present invention, includes an apparatus and method useful for removably and adjustably mounting one or more photovoltaic modules on a surface such as a roof, and includes one or more dual track rails. Also included are at least one clamp configurable in at least two different constructions for securing the rails to a footing grid.

23 Claims, 6 Drawing Sheets

U.S. PATENT DOCUMENTS

| | | | |
|---|---|---|---|
| 4,003,970 A | 1/1977 | Vodicka et al. | |
| 4,032,604 A | 6/1977 | Parkinson et al. | |
| 4,098,854 A | 7/1978 | Knirsch et al. | |
| 4,161,769 A | 7/1979 | Elliott | |
| 4,217,317 A | 8/1980 | Neu et al. | |
| 4,236,283 A | 12/1980 | Marosy | |
| 4,250,779 A | 2/1981 | Feller et al. | |
| 4,252,752 A | 2/1981 | Flandroy et al. | |
| 4,255,991 A | 3/1981 | Lambert | |
| 4,266,384 A * | 5/1981 | Orals et al. | 52/410 |
| 4,288,394 A | 9/1981 | Ewing et al. | |
| 4,314,492 A | 2/1982 | Feller et al. | |
| 4,336,413 A | 6/1982 | Tourneux | 136/251 |
| 4,361,524 A | 11/1982 | Howlett | |
| 4,364,155 A | 12/1982 | Synowicki | |
| 4,367,183 A | 1/1983 | Carbonaro et al. | |
| 4,393,859 A * | 7/1983 | Marossy et al. | 126/586 |
| 4,413,311 A | 11/1983 | Orenstein | |
| 4,415,957 A | 11/1983 | Schwartz | |
| 4,428,893 A | 1/1984 | Cummings, Jr. et al. | |
| 4,476,065 A | 10/1984 | McKey | |
| 4,479,292 A | 10/1984 | Wheeler | |
| 4,541,627 A * | 9/1985 | MacLean et al. | 482/73 |
| 4,563,277 A | 1/1986 | Tharp | |
| 4,569,805 A | 2/1986 | Hume et al. | |
| 4,584,915 A | 4/1986 | Ichiyanagi et al. | |
| D283,911 S | 5/1986 | Miyamoto et al. | |
| 4,600,975 A | 7/1986 | Roberts | |
| 4,607,461 A | 8/1986 | Adams | |
| 4,621,472 A | 11/1986 | Kloke | 52/397 |
| 4,631,134 A | 12/1986 | Schussler et al. | |
| 4,636,577 A * | 1/1987 | Peterpaul | 136/206 |
| 4,662,902 A | 5/1987 | Meyer-Pittroff et al. | |
| 4,679,472 A | 7/1987 | Feller et al. | |
| 4,683,101 A | 7/1987 | Cates | |
| 4,734,191 A | 3/1988 | Schussler et al. | |
| 4,747,980 A | 5/1988 | Bakay et al. | |
| 4,764,314 A | 8/1988 | Schneider et al. | |
| 4,820,412 A | 4/1989 | Meyer-Rudolphi et al. | |
| 4,842,779 A | 6/1989 | Jager et al. | |
| 4,848,048 A * | 7/1989 | Mairlot | 52/86 |
| 4,889,620 A | 12/1989 | Schmit et al. | |
| 4,926,656 A | 5/1990 | Hickley et al. | |
| 4,939,963 A | 7/1990 | Leiber et al. | |
| 4,964,977 A | 10/1990 | Komiya et al. | |
| 5,078,205 A | 1/1992 | Bodas et al. | |
| RE33,812 E | 2/1992 | Schneider et al. | |
| 5,092,087 A * | 3/1992 | Kane et al. | 52/15 |
| 5,093,047 A | 3/1992 | Zeppenfeld | |
| 5,095,594 A | 3/1992 | Marosy | |
| 5,099,402 A | 3/1992 | Starniri | |
| 5,152,202 A | 10/1992 | Strauss | |
| 5,155,893 A | 10/1992 | Nussberger et al. | |
| 5,164,020 A | 11/1992 | Wagner et al. | |
| 5,165,780 A | 11/1992 | Katz | |
| 5,181,442 A | 1/1993 | Nezu et al. | |
| 5,204,028 A | 4/1993 | Ruston | |
| 5,232,518 A * | 8/1993 | Nath et al. | 136/251 |
| RE34,381 E | 9/1993 | Barnes et al. | |
| 5,274,978 A | 1/1994 | Perkonigg et al. | |
| 5,283,981 A | 2/1994 | Johnson et al. | |
| 5,330,688 A | 7/1994 | Downs | |
| 5,347,434 A | 9/1994 | Drake | |
| 5,367,843 A * | 11/1994 | Hirai et al. | 52/200 |
| 5,394,664 A * | 3/1995 | Nowell | 52/200 |
| 5,409,549 A * | 4/1995 | Mori | 136/244 |
| 5,449,036 A | 9/1995 | Genge et al. | |
| 5,511,353 A * | 4/1996 | Jones | 52/536 |
| 5,571,338 A | 11/1996 | Kadonome et al. | 136/251 |
| 5,612,665 A | 3/1997 | Gerhardsen et al. | |
| 5,647,103 A | 7/1997 | Foster | |
| 5,706,617 A * | 1/1998 | Hirai et al. | 52/173.3 |
| 5,718,154 A | 2/1998 | Council, Jr. | |
| 5,724,828 A | 3/1998 | Korenic | |
| 5,779,228 A | 7/1998 | Hansen | |
| 5,787,653 A * | 8/1998 | Sakai et al. | 52/173.3 |
| 5,800,705 A | 9/1998 | Downs | |
| 5,808,893 A | 9/1998 | Pugh et al. | |
| 5,816,318 A | 10/1998 | Carter | |
| 5,855,342 A * | 1/1999 | Hawkins et al. | 248/68.1 |
| 5,944,011 A | 8/1999 | Breslin | 126/633 |
| 5,957,568 A * | 9/1999 | Byers | 362/235 |
| 5,979,119 A * | 11/1999 | Trafton | 52/40 |
| 6,065,255 A | 5/2000 | Stern et al. | 52/173.3 |
| 6,065,852 A | 5/2000 | Crumley | |
| 6,082,870 A | 7/2000 | George | |
| 6,105,317 A | 8/2000 | Tomiuchi et al. | 52/173.3 |
| 6,111,189 A | 8/2000 | Garvison et al. | 136/244 |
| 6,135,621 A | 10/2000 | Bach et al. | |
| 6,142,219 A | 11/2000 | Korenic et al. | |
| 6,170,212 B1 * | 1/2001 | Suchyna et al. | 52/480 |
| 6,205,372 B1 | 3/2001 | Pugh et al. | |
| 6,213,200 B1 | 4/2001 | Carter et al. | |
| 6,269,596 B1 * | 8/2001 | Ohtsuka et al. | 52/173.3 |
| 6,280,535 B2 | 8/2001 | Miyoshi et al. | |
| 6,336,304 B1 * | 1/2002 | Mimura et al. | 52/748.1 |
| 6,349,912 B1 * | 2/2002 | Schauss et al. | 248/298.1 |
| 6,360,491 B1 * | 3/2002 | Ullman | 52/22 |
| 6,370,828 B1 * | 4/2002 | Genschorek | 52/200 |
| 6,416,200 B1 | 7/2002 | George | |
| 6,532,398 B2 | 3/2003 | Matsumoto et al. | |
| 6,543,753 B1 | 4/2003 | Tharp | |
| 6,546,312 B1 | 4/2003 | Matsumoto et al. | |
| 6,553,629 B2 | 4/2003 | Grady et al. | |
| 6,561,117 B1 * | 5/2003 | Kell | 114/343 |
| 6,564,864 B2 | 5/2003 | Carter et al. | |
| 6,579,047 B2 | 6/2003 | Trionfetti et al. | |
| 6,615,564 B2 * | 9/2003 | Lutrario et al. | 52/765 |
| 6,662,074 B2 | 12/2003 | Pugh et al. | |
| 6,663,694 B2 | 12/2003 | Hubbard et al. | |
| 6,755,000 B2 | 6/2004 | Wone Hahn | |
| 6,758,584 B2 | 7/2004 | Bach et al. | |
| 6,796,680 B1 * | 9/2004 | Showers et al. | 362/246 |
| 6,851,820 B2 | 2/2005 | Choi et al. | |

FOREIGN PATENT DOCUMENTS

| | | |
|---|---|---|
| EP | 0244012 B1 | 11/1987 |
| EP | 0741112 B1 | 3/2000 |
| EP | 0783389 B1 | 4/2002 |
| JP | 58049703 A | 10/1984 |

OTHER PUBLICATIONS

"Intellectual Property Portfolio Assessment Report" UniRac Inc. Patent Portfolio Assessment, Next Steps Research, pp. 1-112 (2006).

* cited by examiner

SYSTEM FOR REMOVABLY AND ADJUSTABLY MOUNTING A DEVICE ON A SURFACE

FIELD OF THE INVENTION

The present invention pertains generally to an apparatus and method for removably and adjustably mounting a device on a surface. More particularly, the new and useful invention claimed in this document pertains to an system for securely, safely, yet quickly mounting one or more photovoltaic devices onto a surface including, but not limited to, a roof. The present invention is particularly, but not exclusively, useful for removably attaching one or more photovoltaic modules, panels and arrays to a roof, pole, or other surface, and removing or readjusting the configuration of the apparatus just as safely, reliably and quickly.

BACKGROUND OF THE INVENTION

Mounting devices to surfaces that are, or maybe, exposed to unpredictable and varying force vectors caused by wind, rain, and other elements of weather present technical problems often difficult to solve. A long standing and unsolved challenge in the solar energy industry, for example, has been resolving how best to mount panels, modules and arrays of photovoltaic devices (collectively, "module" or "modules") on surfaces not only securely and safely, but also quickly. The obverse problem also is significant to the industry, namely safely removing or reconfiguring a module that has been installed on a surface.

Solar energy radiation from the sun is capable of producing heat, causing chemical reactions, or generating electricity. The sun is an extremely powerful energy source, and solar radiation is by far the largest source of energy received by Earth, but its intensity at the Earth's surface is comparatively low. This is partly because Earth's atmosphere and its clouds absorb or scatter as much as 54 percent of all incoming sunlight. Solar energy, however, due to technological improvements in the manner of collecting the potential energy, has become increasingly attractive as an energy source: it is inexhaustible in supply, and non-polluting, both in stark contrast to fossil-fuel sources like coal, oil, and natural gas.

Sunlight reaching earth consists of approximately 50 percent visible light, 45 percent infrared radiation, and small amounts of ultraviolet light and other forms of electromagnetic radiation. Radiation is convertible either into thermal energy or directly into electricity by photovoltaic cells. In photovoltaic cells, a small electrical voltage is generated when light strikes the junction between a metal and a semiconductor or a junction between two different semiconductors. Although the voltage generated from a single photovoltaic cell typically is only a fraction of a volt, by connecting large numbers of cells together into panels, modules and arrays, significant electric power can be generated. To harness radiation for direct generation of electricity using cells collected into panels, modules and arrays, a number of apparatus and methods for using and installing the apparatus have been devised on which to mount modules on surfaces exposed to the radiation. The construction, installation, and use of such apparatus present a number of unsolved problems.

A wide variety of racks, frames and associated hardware have been proposed to mount modules on surfaces. Some solutions have proposed modifications of the shape, structure and size of components of a module to achieve more rapid and secure mounting. Other solutions have proposed altering the construct and design of hardware associated with installing racks, framing, and footings into a footing grid on which modules are mounted. As used in this document the term "footing grid" includes a network of keepers often, but not exclusively, L-shaped and formed with at least one hole in each extension of the "L." The keepers are connectable to a surface and are formed and shaped to permit attachment of other hardware components such as rails and frames on which modules may be attached.

Prior approaches suggested for mounting a module on a surface include significant limitations and problems. A serious challenge to providing a useful apparatus and method for mounting a module on a surface arises from the variety of sizes and shapes of the modules, as well as the varying number of modules that might be required in a given situation. Another challenge that earlier suggestions did not overcome is the variety of surfaces on which modules may or must be mounted, including roofs, tops and sides of poles, the ground, and other locations. Many earlier solutions, therefore, required construction of custom built racks to fit each of the enumerable iterations of the sizes and shapes of modules.

Many earlier suggestions for mounting panels, modules and arrays of photovoltaic devices on surfaces are cumbersome, unsafe, and not easily assembled or reconfigured. Also, none of the solutions provided an apparatus, and method for installing the apparatus, that would be universal. The term "universal" refers to an apparatus and method for mounting modules on a wide variety of surfaces that not only accommodate all known shapes, configurations, and numbers of modules, but also permit installation top down as well as bottom up. In the industry associated with installation of photovoltaic modules, the term "top down" refers to mounting photovoltaic modules on structures such as frames and rails that are attached first to the footing and on the surface on which the module is to be mounted before the module is attached to the frames or rails. For example, in the case of a module to be mounted on a building, one or more rails first would be attached to a footing grid that earlier has been attached to the surface, in this instance the roof; thereafter, one or more modules would be attached to the rails. Hardware that secures the module to the rails is attached from the top, or front, of the module. The term "bottom up" refers to positioning a photovoltaic module by first attaching the module to the footing grid and to the roof or other surface. In bottom up mounting, hardware used to secure the module to the rail is attached from the bottom or back of the module. The uniqueness of each installation, an installer's preferences, and the particular module all will determine whether a top down or bottom up installation is used. Significantly, none of the currently available apparatus for mounting photovoltaic modules to a surface allow installation both top down and bottom up using the same rail system.

Another limitation of current approaches for mounting photovoltaic modules to a surface is the excessive number and variety of hardware parts and components that are required to assemble a frame or rail system. Each module or combination of modules installed may present different shapes, sizes and configurations, thus requiring a unique combination of mounting hardware.

Still another unresolved problem arises from the varying shapes, sizes and configurations of modules. The arrangement of the modules on a surface such as a roof may not be dimensionally consistent with the location of rafters underneath the roof into which hardware must be inserted to hold the footing grid and rails.

Still another limitation of present apparatus for assembling and mounting modules on surfaces is the absence of a system and apparatus that permits easily adjusting and readjusting of the location on a rail on which the module may be positioned.

Therefore, a previously unaddressed need exists in the industry for a new and useful system for positioning a device such as a photovoltaic panels, modules and arrays of photovoltaic devices on a surface such as a roof, pole or other surface. Particularly, there is a significant need for a method and apparatus for mounting one or more photovoltaic modules safely, reliably, yet quickly on a surface; removing or reconfiguring the modules just as safely, reliably and quickly; and providing a system that is adjustable and expandable to allow a variety of dimensions and configurations.

SUMMARY OF THE INVENTION

Given the conventional solutions for solving the problems associated with removably and adjustably mounting a device such as a module having any of size and shape on a wide variety of surfaces; and of mounting varying shapes, sizes and configurations of modules on a surface such as a roof that may not be dimensionally consistent with the location of rafters underneath the roof into which hardware must be inserted to hold the footing grid and rails; and of reducing the number and variety of different hardware components that installers must use to install modules, it would be desirable, and of considerable advantage, to provide an interrelated system for quickly and safely mounting a module on a surface that overcomes those problems.

The present invention provides numerous advantages in connection with mounting, attaching, adjusting the configuration of one or more modules, and removing the one or more modules from a surface in a safe, reliable, yet rapid manner. At least one of the advantages of the present invention is that it provides an apparatus, and a method of installing the apparatus, that allows installation both top down and bottom up using the same rail system. The present invention also significantly reduces the number and variety of hardware parts and components needed to assemble the apparatus. In addition, the system for removably and adjustably mounting a device on a surface provides universal hardware, permitting installation of a module on a surface either in any direction or configuration.

In addition, the present invention also allows assembly of photovoltaic modules of any size or shape on a variety of surfaces, while insuring that the footing grid remains securely attached to the surface. The unique dual track rail of the present invention, in combination with the novel clamps of the present invention, also permit ready slidable adjusting and readjusting of the location on a rail on which the module may be positioned. Equally significant, the present invention provides an apparatus and method for removably and adjustably mounting a device such as a module on a surface which respectively are easy to use and to practice, and which are cost effective for their intended purposes.

These and other advantages are achieved in the present invention by providing a system for removably and adjustably mounting a device on a surface that includes a rail formed with at least two tracks, and one or more clamps for interconnecting the system. Each of the tracks includes a channel extending the length of the rail. A slot also extending the length of the rail is formed in each channel. The slots are arranged at approximately a right angle to each other. The unique channel construction helps achieve the advantages of the present invention by making the rail adjustable to a wide variety of modules. To add universality of application to the present invention, the system for removably and adjustably mounting a device on a surface also includes at least two different constructions of clamps for top down mounting. One configuration of the clamps is a duct with at least two opposing flanges substantially perpendicular to one another, and is used primarily for mounting adjacent edges of different modules to a rail.

The advantages and other objects of the present invention, and features of such a system for removably and adjustably mounting a device on a surface, will become apparent to those skilled in the art when read in conjunction with the accompanying following description, drawing figures, and appended claims. It is clear, however, from the foregoing that the claimed subject matter as a whole, including the structure of the apparatus, and the cooperation of the elements of the apparatus, as well as the method for installing and using the apparatus, combine to result in a number of unexpected advantages and utilities of the present invention.

In addition, the foregoing has outlined broadly the more important features of the invention to better understand the detailed description which follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for purpose of description, and should not be regarded as limiting.

As used in this document, the term "device" is not limited to the photovoltaic environment. For example, but not by way of limitation, the term includes any device capable of generating power, but may also be a device capable of holding liquids, gases or admixtures of solids. A device may be mounted on a surface which may include the roof or wall of a building, a pole, or any other surface. The shape of the device is not material to the present invention, and may be rectangular, circular, or any other shape or configuration.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENTS

Briefly, the present invention provides a system for removably and adjustably mounting a device on a surface. The invention includes one or more dual track rails and one or more unique clamps that may be interconnected to a footing grid.

Figure 1:
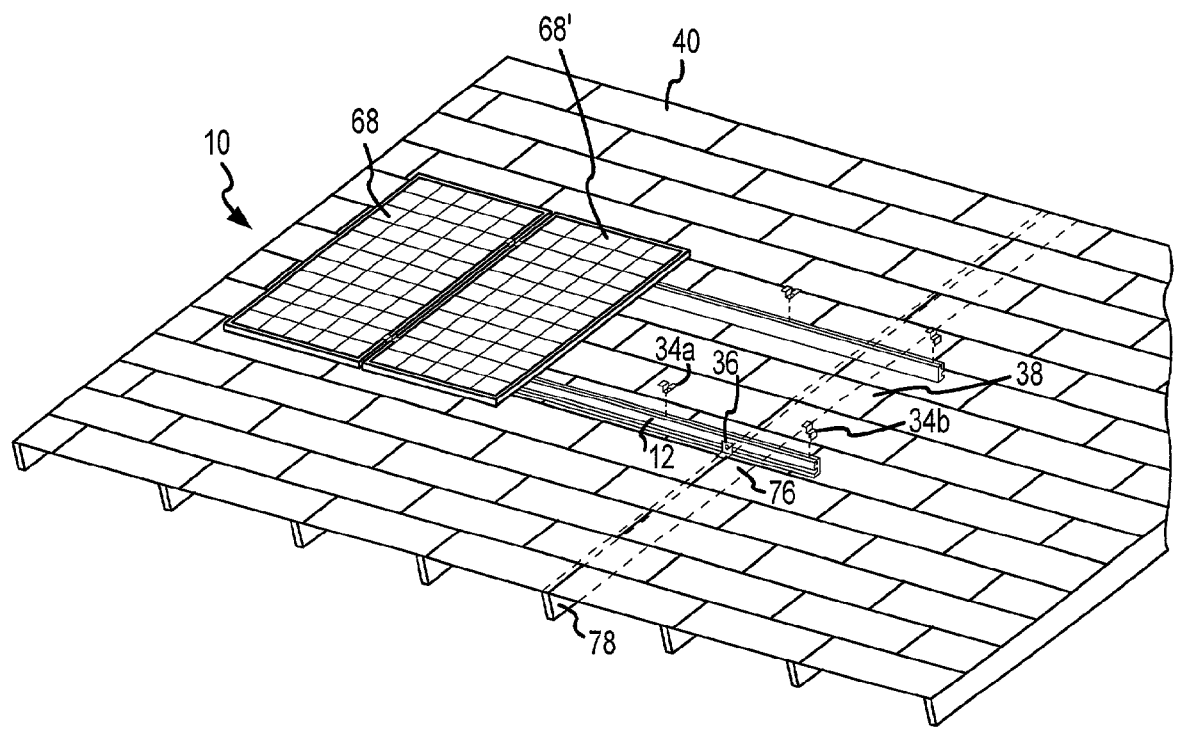
FIG. 1 is a perspective view of the system for removably and adjustably mounting a device on a surface in an operative environment as an apparatus for removably and adjustably mounting one or more photovoltaic modules on a surface such as a roof as shown.
Figure 3:
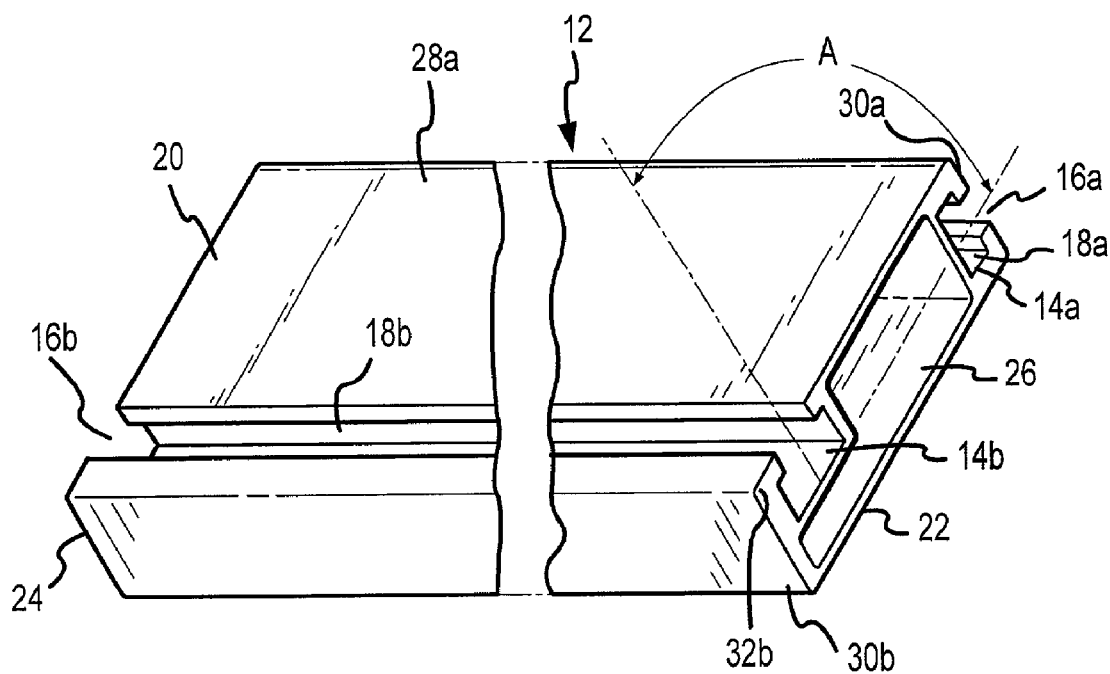
FIG. 3 is a perspective view of a rail in accordance with the present invention.
Figure 5:
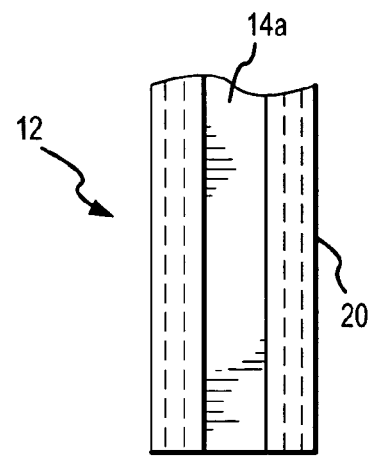
FIG. 5 is a top view of a rail in accordance with the present invention.
Figure 6:
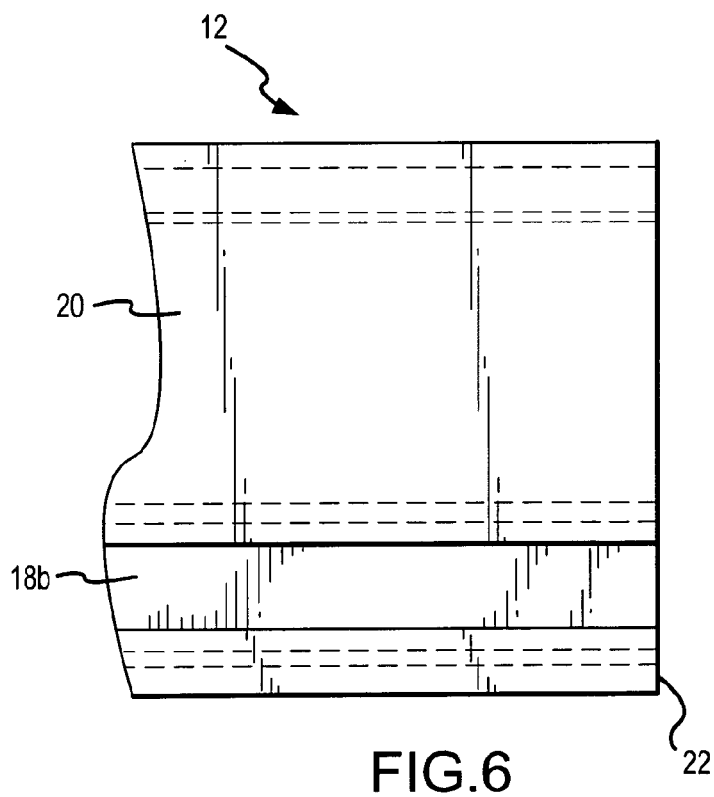
FIG. 6 is a side view of a rail in accordance with the present invention.
Figure 4:
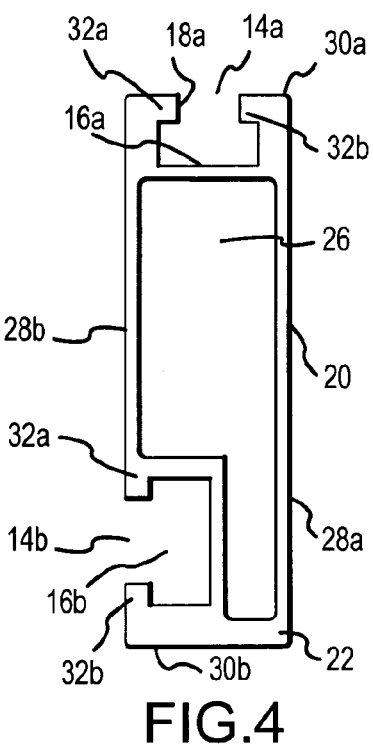
FIG. 4 is an end view of a rail in accordance with the present invention.
Figure 7:
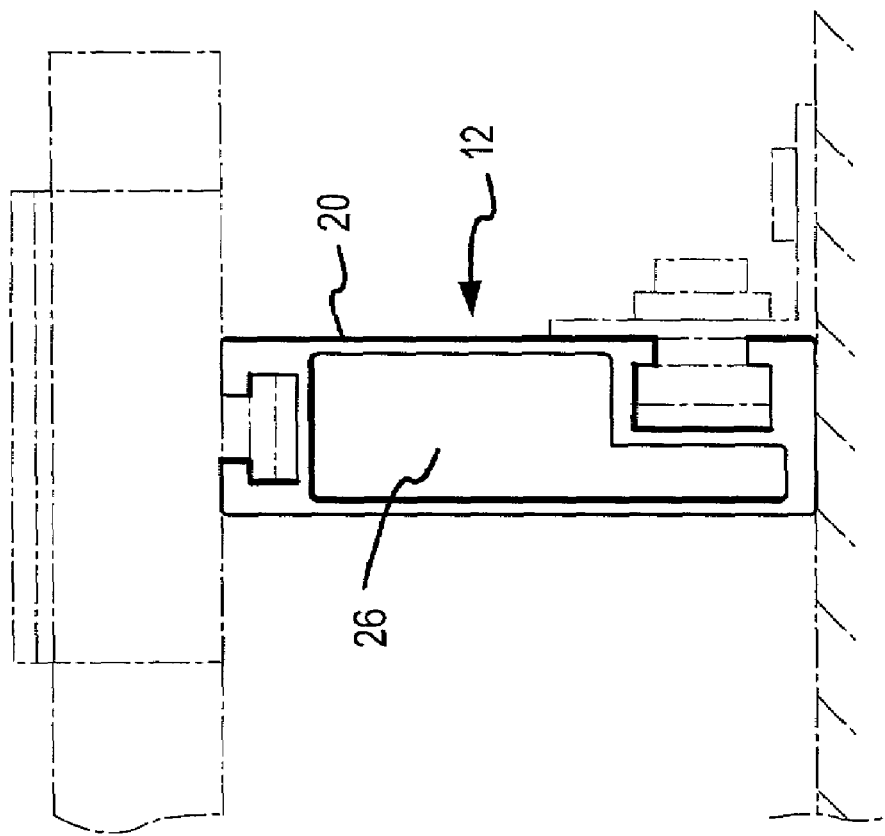
FIG. 7 shows additional end views of a rail in accordance with the present invention.
Figure 7:
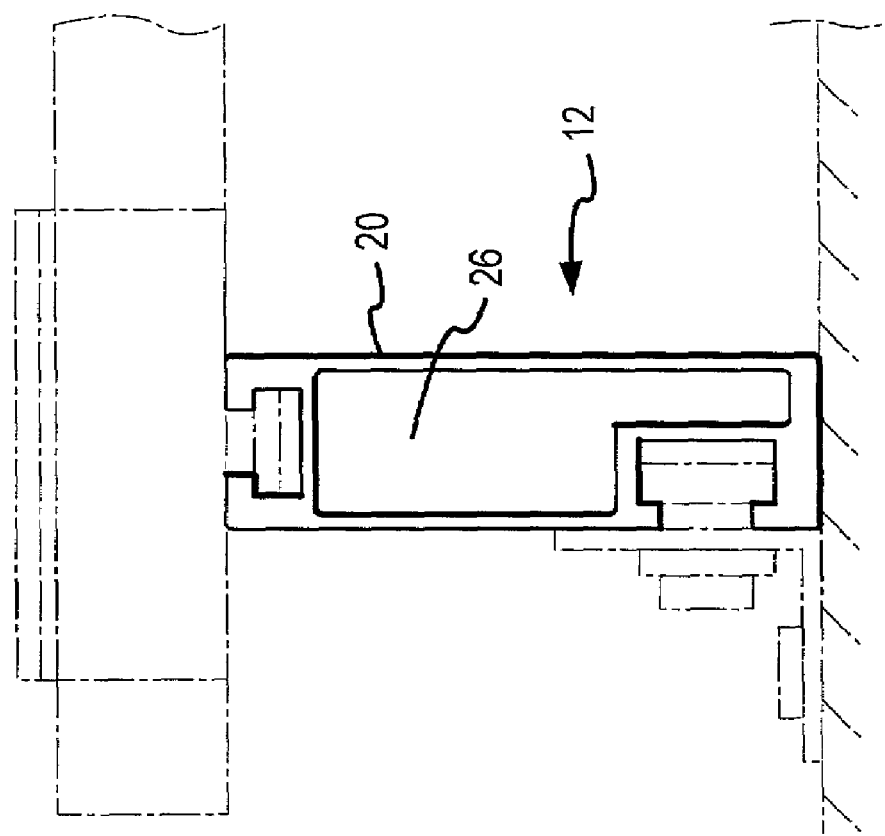
Figure 8:
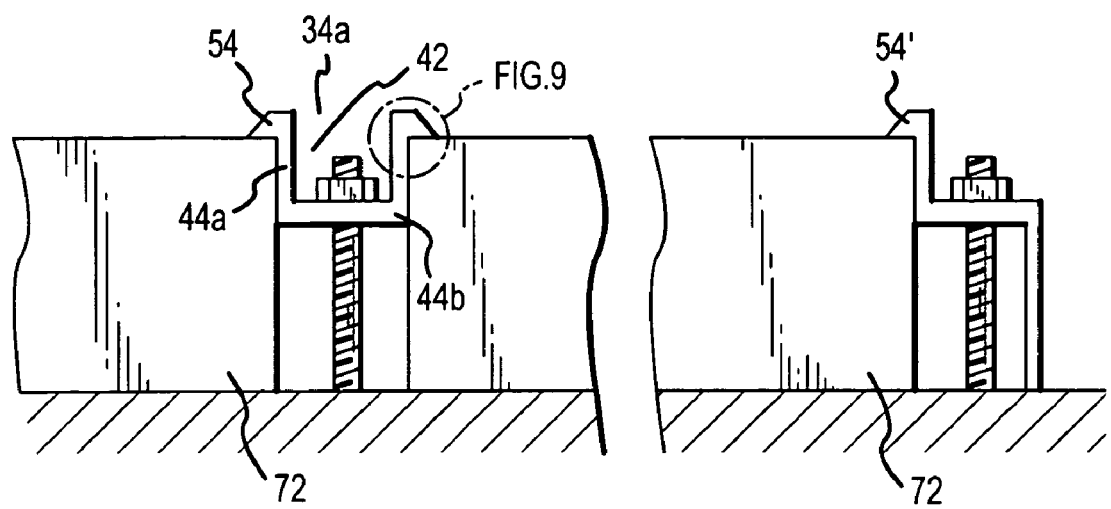
FIG. 8 shows a front view of clamps in accordance with the present invention.

FIG. 1 illustrates the system for removably and adjustably mounting a device on a surface in an operative environment. As shown, the present invention is an apparatus for removably and adjustably mounting one or more photovoltaic modules on a surface such as a roof. Referring initially to FIG. 1, the system for removably and adjustably mounting a device on a surface is shown and generally designated 10. The system for removably and adjustably mounting a device on a surface 10, according to the present invention, includes at least one rail 12. In a preferred embodiment of the present invention, at least one rail 12 is formed of extruded aluminum, but the material used is not a material consideration to the present invention. As shown perhaps best by cross-reference between FIGS. 3-7, at least one rail 12 is formed with at least two tracks 14a,b. Both of at least two tracks 14a,b include a channel 16a,b, perhaps best shown in FIGS. 3 and 4, extending the length of at least one rail 12 substantially coincident with the longitudinal axis of at least one rail 12. Each channel 16a,b in at least two tracks 14a,b is formed with a slot 18. Slot 18 extends the length of at least one rail 12 substantially coincident with the longitudinal axis of at least one rail 12. In addition, in accordance with the present invention, slot 18a in channel 16a of at least one rail 12 is formed substantially at a right angle A to slot 18b in any other of at least two tracks 14a,b, as shown diagrammatically in FIG. 3. As shown in FIGS. 3, 4 and 7, at least one rail 12 is formed with a body 20. Body has a proximal end 22, a distal end 24, and a hollow chamber 26 between proximal end 22 and distal end 24 of body 20. Hollow chamber 26 contributes to the light weight yet structural rigidity of at least one rail, and therefore to its ease of handling during installation of system for removably and adjustably mounting a device on a surface 10. In a preferred embodiment of the present invention, at least one rail 12 also is formed with opposing sides 28a,b and opposing shoulders 30a,b.

As further shown in FIGS. 3, 4 and 7, body 20 includes channel 16b formed in opposing side 28b for slidably engaging the rail on hardware described below. Channel 16b is formed with slot 18b extending along the longitudinal axis of at least one rail 12. In a preferred embodiment of the present invention, slot 18a also includes opposing jaws 32a,b monolithically protruding from slot 18 substantially along the longitudinal axis of the first channel 16. Body 20 further includes channel 16a. Channel 16a is formed in opposing shoulder 30a as shown in FIGS. 3 and 4. Channel 16a also contributes, in combination with channel 16b, to making at least one rail 12 slidably engageable with the one or more footings 36. As will be apparent to a person skilled in the art, channel 16a and channel 16b enable at least one rail 12 to be slidable engageable with one or more footings 36.

As also shown by cross-reference among FIGS. 8-11, a system for removably and adjustably mounting a device on a surface 10 also includes one or more clamps 34. As shown best by reference to FIGS. 8 and 10, one or more clamps 34 are formed as a duct 42. Duct 42 includes at least two opposing flanges 44. Opposing flanges 44 of one or more clamps 34 are substantially parallel to one another. One or more clamps 34 may also be described as formed with a plate 46 and monolithic opposing side walls 48 extending substantially in the same direction at substantially right angles B from plate 46. Opposing side walls 48 include a lower inner edge 50 and an upper face 52. A fin 54 extends from upper face 52 substantially along the longitudinal axis of one or more clamps 34a. One or more clamps 34 also includes least one hole 56 through plate 46 for securing one or more clamps 34 as described below.

Figure 11:
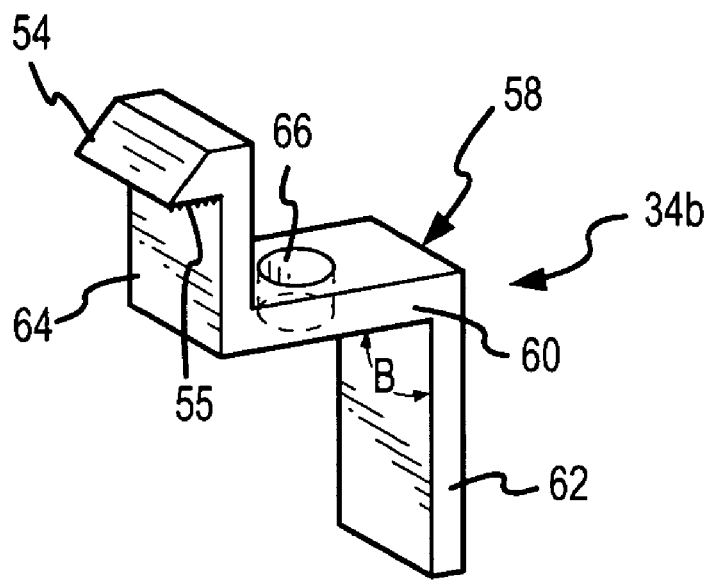
FIG. 11 is a perspective view of yet another embodiment of the clamp.

In an alternative embodiment of one or more clamps 34, one or more clamps 34 is formed with a leg 58 having a base 60 as shown best in FIG. 11. From base 60 of leg 58 a descending member 62 monolithically extends from base 60. In addition, from base 60 of leg 58 an ascending member 64 monolithically extends from base 60 in a direction substantially opposite the direction of descending member 62. As also shown in FIG. 11, one or more clamps 34 include means 66 for connecting base 60 to at least one rail 12. One or more clamps 34 also includes means 70 for variably positioning one or more clamps 34 in channel 16 of at least one rail 12.

Figure 2:
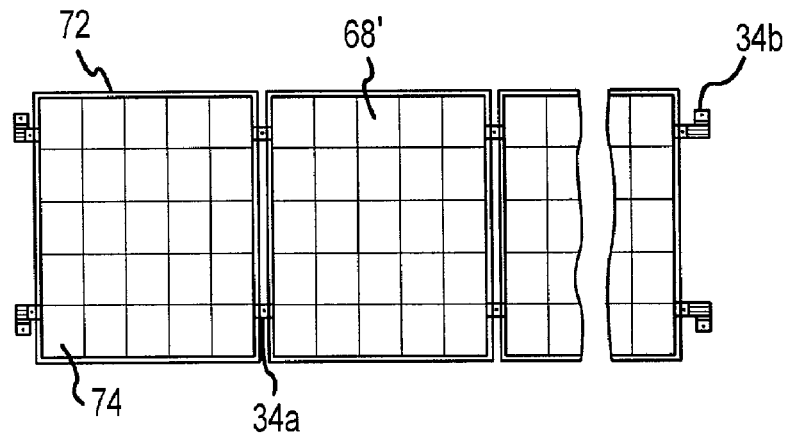
FIG. 2 is a top view of a module installed on a surface.

FIG. 1 also shows a device 68 that may be mounted on surface 40 using the present invention. In a preferred embodiment of the present invention, device 68 is a photovoltaic module 68', also shown in FIG. 2. Photovoltaic module 68' is formed with an edge 72. In a photovoltaic environment for application of the present invention, edge 72 holds one or more photovoltaic panels 74. As also shown best in FIGS. 1 and 2, footing grid 38 includes one or more footings 36. In combination, the one or more footings 36 compose a network of keepers 76. In the preferred embodiment of the present invention, each of the network of keepers 76 is L-shaped and constructed of metal. Neither the shape nor material of the keepers 76 is a material limitation of the present invention. Each of keepers 76 may be fastened to surface 40. If surface 40 is a roof of a building, keepers 76 may be attached to surface 40 by inserting lag bolts (not shown) through keepers 76 into rafters 78 beneath surface 40. Once installed, keepers 76 form a grid, as shown in FIG. 1, on which at least one rail 12 of the present invention is removably connectable.

Figure 9:
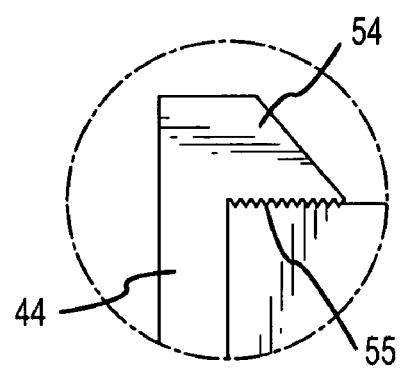
FIG. 9 shows a blown up view of the fin of a clamp as noted in FIG. 8.
Figure 10:
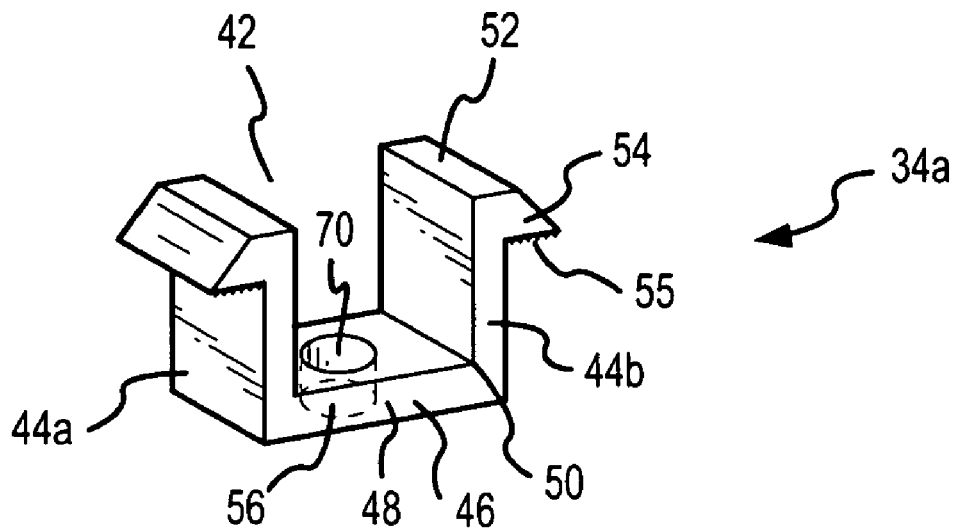
FIG. 10 is a perspective view of one embodiment of the clamp.

Using the principal embodiment of the present invention, in operation one or more clamps 34 are variably positionable not only on at least one rail 12, but also on footing grid 38 for demountably securing module 68' to footing grid 38, as shown by reference to FIG. 1. As shown in FIG. 9, a preferred embodiment of fin 54 includes a serrated surface 55 that grips edge 72 of module 68' with significant torsional rigidity, but because of the use of conventional hardware for attaching one or more clamps 34 to edge 72 of module 68', one or more clamps 34 are quickly and safely repositionable. As further shown in Figure, channel 16a, during installation, maybe slidably engaged with at least one rail 12 and to footing grid 38. As shown in Figure, slot 18 includes opposing jaws 32 monolithically protruding from slot 18 substantially along the longitudinal axis of channel 16a. Jaws 32 contribute to making one or more clamps 34 slidable and removably engageable, and therefore allow the present invention to be not only mounted, but reconfigured on surface 40. Channel 16b also contributes, in combination with first channel 16a, to making at least one rail 12 slidably engageable, and repositionable, with one or more clamps 34. As will be apparent to a person skilled in the art, channel 16a and channel 16b enable at least one rail 12 to be slidable engageable with not only one or more clamps 34, but also with footers 36 comprising footing grid 38.

While the system for removably and adjustably mounting a device on a surface 10 as shown in drawing FIGS. 1 through 11 is one embodiment of the present invention, it is only one such embodiment of the invention, is not intended to be exclusive, and is not a limitation of the present invention. The particular a system for removably and adjustably mounting a device on a surface as shown and disclosed in detail in this instrument is fully capable of obtaining the objects and providing the advantages stated, but this disclosure is merely illustrative of the presently preferred embodiments of the invention, and no limitations are intended in connection with the details of construction, design or composition other than as provided and described in the appended claims.

What is claimed is:

1. A system for removably and adjustably mounting a photovoltaic module or other flat panel on a surface, comprising: a rail formed with at least two tracks,
   wherein the rail is formed with a body having a proximal end, a distal end, and a hollow chamber there between,
   and further wherein the rail is removably mountable on a footing grid,
   and further wherein the at least two tracks include a channel extending the length of the rail,
   and further wherein the channel in the at least two tracks is formed with a slot extending the length of the rail, wherein the slot in one of the at least two tracks is formed at substantially a right angle to the slot in any other of the at least two tracks;
a plurality of keepers on which to mount the rail;
   and one or more clamps for connecting the system to the surface, wherein the one or more clamps is formed with a leg having a base, a descending member monolithically extending from the base, and an ascending member monolithically extending from the base in a direction substantially opposite the direction of the descending member.

2. An apparatus for positioning a photovoltaic module or other flat panel on a surface, comprising:
   a footing grid, wherein the footing grid includes at least one keeper;
   at least one dual track rail removably mountable on the footing grid,
   and further wherein the footing grid comprises means for variably positioning the at least one dual track rail on the at least one keeper; and
   one or more clamps variably positionable on the dual track rail and footing grid for demountably securing the module to the footing grid,
   and further wherein the at least one dual track rail includes a body having a proximal end, a distal end, a hollow chamber between the proximal end and distal end, opposing sides, and opposing shoulders.

3. An apparatus for positioning a photovoltaic module or other flat panel on a surface as recited in claim 2, wherein the body further comprises a first channel formed in one of the opposing sides for slidably engaging the rail to the footing grid.

4. An apparatus for positioning a photovoltaic module or other flat panel on a surface as recited in claim 3, wherein the first channel is formed with a slot extending along the longitudinal axis of the dual track rail.

5. An apparatus for positioning a photovoltaic module or other flat panel on a surface as recited in claim 4, wherein the slot includes opposing jaws monolithically protruding from the slot substantially along the longitudinal axis of the first channel.

6. An apparatus for positioning a photovoltaic module or other flat panel on a surface as recited in claim 5, wherein the body further comprises a second channel formed in one of the opposing shoulders for slidably engaging the rail on the one or more clamps.

7. An apparatus for positioning a photovoltaic module or other flat panel on a surface as recited in claim 6, wherein the one or more clamps includes means for variably positioning the one or more clamps in the second channel, and for positioning the at least one keeper in the first channel of the at least one dual track rail.

8. An apparatus for positioning a photovoltaic module or other flat panel on a surface as recited in claim 2, wherein the one or more clamps is formed with a plate and monolithic opposing side walls extending substantially in the same direction at substantially right angles from the plate.

9. An apparatus for positioning a photovoltaic module or other flat panel on a surface as recited in claim 8, wherein the opposing side walls include a lower inner edge and an upper face, and a fin extending from the upper face substantially along the longitudinal axis of the at least one dual track rail.

10. An apparatus for positioning a photovoltaic module or other flat panel on a surface as recited in claim 2, wherein the one or more clamps is formed with at least one hole through the plate for securing the clamp on the at least one dual track rail.

11. An apparatus for positioning a photovoltaic module or other flat panel on a surface as recited in claim 2, wherein the one or more clamps is formed with a leg having a base, a descending member monolithically extending from the base, and an ascending member monolithically extending from the base in a direction opposite the descending member.

12. An apparatus for positioning a photovoltaic module or other flat panel on a surface as recited in claim 11, wherein the ascending member further includes a projecting distally longitudinal fin extending in the direction opposite the ascending member.

13. An apparatus for positioning a photovoltaic module or other flat panel on a surface as recited in claim 12, wherein the base is formed with at least one hole through the base.

14. A system for removably and adjustably mounting a photovoltaic module or other flat panel on a surface comprising:
   a rail formed with at least two tracks,
      wherein the at least two tracks include a slot formed at substantially a right angle to the slot in any other of the at least two tracks,
      and further wherein the rail is formed with a body having a proximal end, a distal end, and a hollow chamber there between;
   and one or more clamps for connecting the system to the surface,
      wherein the one or more clamps is formed with a leg having a base, a descending member monolithically extending from the base, and an ascending member monolithically extending from the base in a direction substantially opposite the direction of the descending member.

15. An apparatus for positioning a photovoltaic module or other flat panel on a surface, comprising:
- a footing grid, wherein the footing grid includes at least one keeper;
- at least one dual track rail removably mountable on the footing grid,
- wherein the at least one dual track rail includes a body having a proximal end, a distal end, a hollow chamber between the proximal end and distal end, opposing sides, and opposing shoulders;
- and further wherein the body further comprises a first channel formed in one of the opposing sides for slidably engaging the rail to the footing grid;
- and one or more clamps variably positionable on the dual track rail and footing grid for demountably securing the module to the footing grid,
  - wherein the one or more clamps includes means for variably positioning the one or more clamps in the first channel, and for positioning the at least one keeper in the first channel of the at least one dual track rail.

16. An apparatus for positioning a photovoltaic module or other flat panel on a surface as recited in claim 15, wherein the first channel is formed with a slot extending along the longitudinal axis of the dual track rail.

17. An apparatus for positioning a photovoltaic module or other flat panel on a surface as recited in claim 16, wherein the slot includes opposing jaws monolithically protruding from the slot substantially along the longitudinal axis of the first channel.

18. An apparatus for positioning a photovoltaic module or other flat panel on a surface as recited in claim 15, wherein the one or more clamps is formed with a plate and monolithic opposing side walls extending substantially in the same direction at substantially right angles from the plate.

19. An apparatus for positioning a photovoltaic module or other flat panel on a surface as recited in claim 18, wherein the opposing side walls include a lower inner edge and an upper face, and a fin extending from the upper face substantially along the longitudinal axis of the at least one dual track rail.

20. An apparatus for positioning a photovoltaic module or other flat panel on a surface as recited in claim 18, wherein the variably positioning means includes at least one hole through the plate for securing the clamp on the at least one dual track rail.

21. An apparatus for positioning a photovoltaic module or other flat panel on a surface as recited in claim 15, wherein the one or more clamps is formed with a leg having a base, a descending member monolithically extending from the base, and an ascending member monolithically extending from the base in a direction opposite the descending member.

22. An apparatus for positioning a photovoltaic module or other flat panel on a surface as recited in claim 21, wherein the ascending member further includes a projecting distally longitudinal fin extending from in the direction opposite the ascending member.

23. An apparatus for positioning a photovoltaic module or other flat panel on a surface as recited in claim 22, wherein the base is formed with at least one hole through the base.

* * * * *

US007434362C1

(12) INTER PARTES REEXAMINATION CERTIFICATE (983rd)
United States Patent
Liebendorfer

(10) Number: US 7,434,362 C1
(45) Certificate Issued: Oct. 31, 2014

(54) SYSTEM FOR REMOVABLY AND ADJUSTABLY MOUNTING A DEVICE ON A SURFACE

(75) Inventor: John E. Liebendorfer, Albuquerque, NM (US)

(73) Assignee: Unirac, Inc., Albuquerque, NM (US)

Reexamination Request:
No. 95/001,706, Aug. 9, 2011

Reexamination Certificate for:
Patent No.: 7,434,362
Issued: Oct. 14, 2008
Appl. No.: 09/910,655
Filed: Jul. 20, 2001

(51) Int. Cl.
*E04D 13/18* (2014.01)
*E04C 3/00* (2006.01)
*H01L 31/042* (2014.01)

(52) U.S. Cl.
USPC .............................. 52/173.3; 52/460; 136/244

(58) Field of Classification Search
None
See application file for complete search history.

(56) References Cited

To view the complete listing of prior art documents cited during the proceeding for Reexamination Control Number 95/001,706, please refer to the USPTO's public Patent Application Information Retrieval (PAIR) system under the Display References tab.

*Primary Examiner* — Sara Clarke

(57) ABSTRACT

A system for removably and adjustably mounting a device on a surface is provided. The system for removably and adjustably mounting a device on a surface, according to the present invention, includes an apparatus and method useful for removably and adjustably mounting one or more photovoltaic modules on a surface such as a roof, and includes one or more dual track rails. Also included are at least one clamp configurable in at least two different constructions for securing the rails to a footing grid.

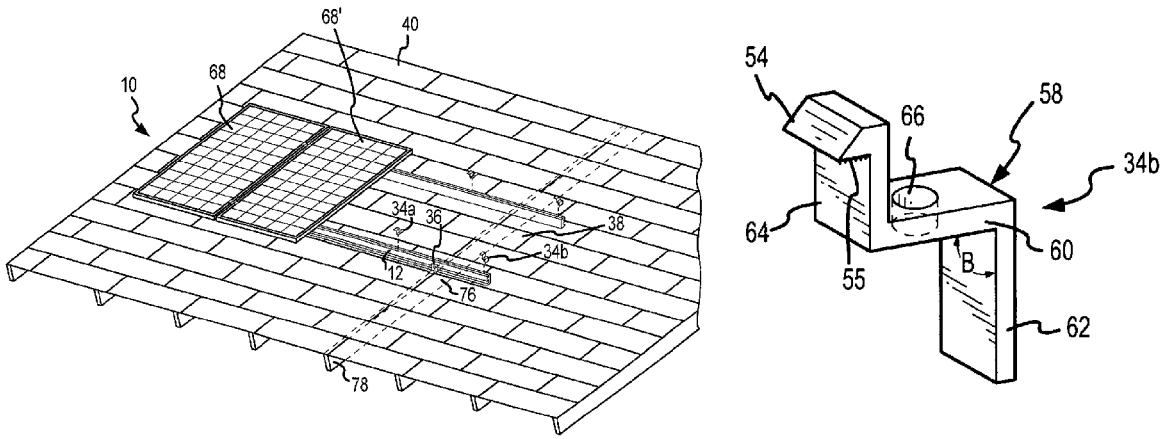

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 3-7, 9, 10, 13 and 15-23 is confirmed.

Claims 1, 2, 8, 11, 12 and 14 are cancelled.

\* \* \* \* \*